Nov. 22, 1966  J. J. CONNORS, JR., ET AL  3,287,562
PHOTOSENSITIVE SCANNING MEANS FOR ROTATING AN
IMAGE WITH RESPECT TO A LIGHT MODULATOR
Filed Feb. 28, 1964
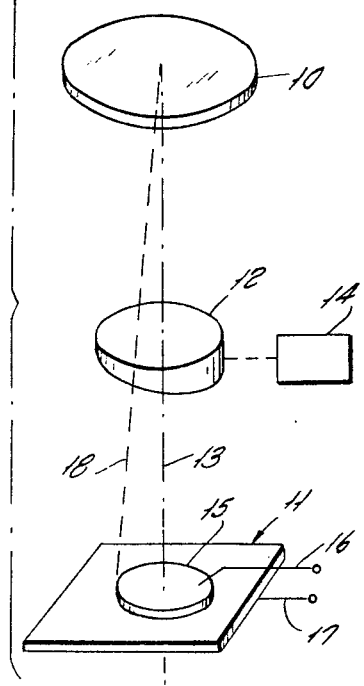
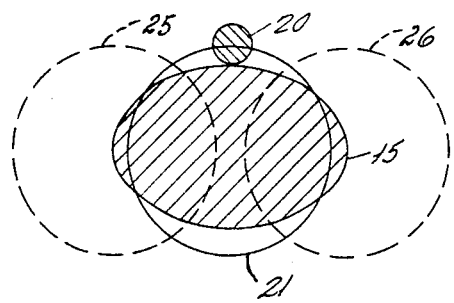
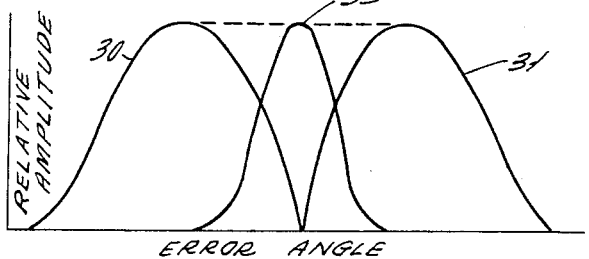
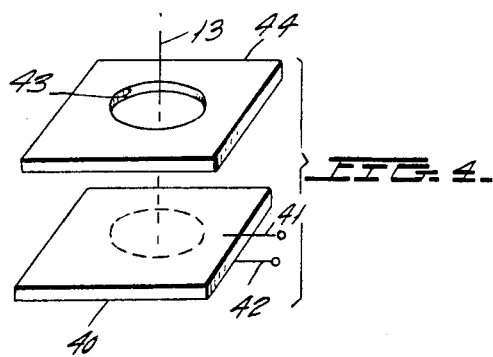
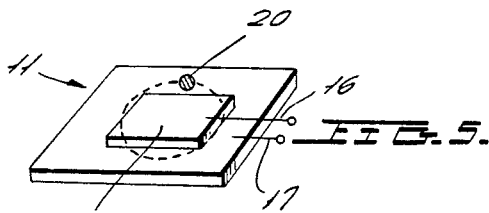
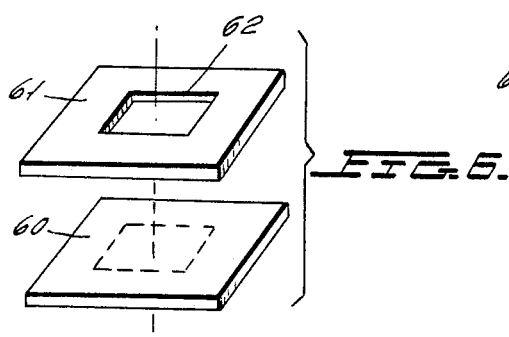
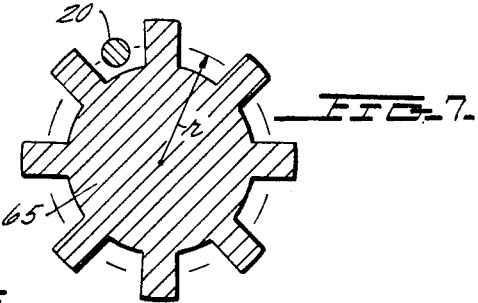
INVENTORS
JAMES J. CONNORS, JR.
JOHN W. BARNES
BY
OSTROLENK, FABER, GERB & SOFFEN
ATTORNEYS 3,287,562
PHOTOSENSITIVE SCANNING MEANS FOR ROTATING AN IMAGE WITH RESPECT TO A LIGHT MODULATOR
James J. Connors, Jr., Huntington Station, and John W. Barnes, Floral Park, N.Y., assignors to Kollsman Instrument Corporation, Elmhurst, N.Y., a corporation of New York
Filed Feb. 28, 1964, Ser. No. 348,019
8 Claims. (Cl. 250—203)

This application relates to light modulation systems for navigational devices, and more specifically relates to a scanning system wherein the image of a source to be tracked is rotated with respect to a light modulation means.

More particularly, the image of the object being tracked is rotated about its optical axis, and is directed toward a suitable light detection means. A modulation means is then interposed between the image and detector and could, for example, be a square, rectangular or elliptical aperture which intercepts the rotating image, depending upon the location of the center of rotation of the image with respect to the center of the aperture.

Alternatively, the elliptical rectangular or square aperture could be replaced by a suitably shaped square, rectangular or elliptical photosensitive surface.

Whichever system is used, so long as the image position is rotated about the effective center of the modulation means, the output of the photodetector means will be at a frequency different from its frequency when the image is off center. Moreover, the phase of the output of the photodetector will be related to the direction in which the image has moved off the null or centered position. Therefore, standard and well-known output circuits can be used which suitably process this information.

Accordingly, a primary object of this invention is to provide a novel scanning system for a radiation tracking device.

Another object of this invention is to provide a novel tracking system which employs a square or elliptical modulation mode for the rotating image of a light source.

A further object of this invention is to provide a novel scanning system for a navigational device which binds itself to simple output circuits.

These and other objects of this invention will become apparent from the following description when taken in connection with the drawings, in which:

FIGURE 1 shows the novel system when using an elliptical photosensitive detector.

FIGURE 2 shows the manner in which the image rotates about the surface of the elliptical detector of FIGURE 1.

FIGURE 3 shows the modulated signal characteristics of the system of FIGURE 1.

FIGURE 4 illustrates an elliptical aperture and photodetector which can replace the elliptical detector of FIGURE 1.

FIGURE 5 illustrates a square photosensitive area that can replace the elliptical unit of FIGURES 1 and 2.

FIGURE 6 shows a square aperture and photodetector which can replace the unit of FIGURE 5.

FIGURE 7 shows a gear tooth shaped photosensitive region.

Referring now to FIGURE 1, we have schematically shown therein a tracking system wherein an objective lens 10 is used to collect collimated light from a distant point source to form an image at the focal plane which has detector 11 therein. An optical wedge is rotated about its axis and about the optical axis (dot 2, dash line 13) of the system by a suitable motor 14. This causes the image of the source being tracked to rotate about a circular path thereby periodically invading the photosensitive area 15 in detector 11. The photosensitive area 15 is then provided with output conductors 16 and 17 which are connected to suitable output circuitry.

A system generally of this type is known where the photosensitive area 15 was circular. In such a case when the optical axis 13 is aligned to a distant point source, the image at the focal plane will traverse the edge of the sensor and result in an output signal equal to zero. When the system is misaligned, as indicated by the off-axis line 18 (the image will now rotate about axis 18), the image will periodically invade the circular sensor area resulting in an output signal having an amplitude and phase which is dependent on line-of-sight displacement and angular position with respect to the sensor area respectively.

In accordance with the invention, the effective sensor area is made noncircular. Thus, in FIGURES 1 and 2, the photosensitive area 15 is made elliptical. The target image 20, which rotates on a scanning radius 21, will then generate a signal which is at twice the frequency of an error signal where this second frequency is at a maximum at the point of alignment.

This is best understood from FIGURE 3 which shows relative amplitude of the output signal as a function of error angle, or direction of the outer of the circular scan of the aperture from the center of the photosensitive area.

Should the scanning radius drift to the left (dotted line 25) so the target image passes through the photosensor area only once per cycle, an error signal, shown by curve 30, is generated which is at the frequency of rotation of the image. Should the scanning circle drift to the right (dotted line 26), then the error signal is that of curve 31 and is again at the frequency of rotation of image 20, but with a phase reversed from that of curve 30.

So long as the target image radius is near the center of the photosensitive area 15, a double frequency signal 33 will be generated. This signal, which increases in magnitude as the axis 18 comes closer to alignment with axis 13, may then be used as a null indicating signal.

The novel system of FIGURES 1 and 2 then provide an output whereby, by summing the signals 30, 31 and 32, a presence signal may be derived for the field of view. By isolating the error signals 30 and 31 from signal 33, by suitable filter circuits, a signal is available for nulling purposes or determination of alignment error to the line-of-sight.

While FIGURES 1 and 2 show the elliptical detector as a photosensitive area, it can be replaced by a planar photodetector area and a masking aperture therefor. Thus, as shown in FIGURE 4, the detector 11 of FIGURE 1 is replaced by planar photosensitive surface 40 having output leads 41 and 42 and an elliptical aperture 43 in masking plate 44. This arrangement, in effect, shadows surface 40 as indicated in dotted lines with operation proceeding exactly as described for FIGURES 1, 2 and 3.

While FIGURES 1 through 4 describe the novel system for an elliptical photosensitive region, it will be understood that other noncircular arrangements could be used which include gear tooth patterns, star patterns, squares and the like.

FIGURE 5 illustrates the detector 11 of FIGURE 1 as having a square photosensitive region 50. The target image 20 will have a scanning diameter which is smaller than the diagonal length of square 50, but greater than the length of the side of the square. Thus, as the area 20 is rotated while aligned with the optical axis of the system, a null signal (signal 33 of FIGURE 3) will be generated, which has a frequency four times the frequency of rotation of image 20. In all other respects, the system using the square aperture operates identically to that of FIGURES 1 and 2.

Clearly, the square photodetector system of FIGURE 5 could be replaced, as shown in FIGURE 6, by a planar photodetector surface 60 and a plate 61 having a square aperture 62 therein.

FIGURE 7 illustrates a gear tooth shaped photosensitive region 65 where the image 20 rotates about a radius $r$. Here, a null signal having an output frequency equal to eight times the frequency of rotation of image 20 is generated.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. A scanning system for a light tracking device comprising objective means for forming an image of a light source to be tracked, an image rotating means for continuously circularly rotating said image in a circular path at a predetermined frequency, and a fixed light detector means; said image rotating means being interposed between said objective means and said light detector means; said light detector means being symmetrically disposed about the optical axis of said objective means; said light detector means being positioned in the focal plane of said objective means; said light detector having a uniform central body portion and a non-circular periphery which includes a first radius portion and a second radius portion different from said first radius portion; said first radius portion being smaller than the radius of the circular path tracked by said image; said second radius portion being larger than the radius of the circular path tracked by said image.

2. The device substantially as set forth in claim 1 wherein said light detector includes a planar photosensitive surface and a masking aperture; said masking aperture symmetrically disposed about the optical axis of the objective means with said first and second radius portions therein.

3. The device substantially as set forth in claim 1 wherein said light detector means has an effective elliptical shape.

4. The device substantially as set forth in claim 1 wherein said light detector means has an effective square shape.

5. The device substantially as set forth in claim 1 wherein said light detector means has an effective gear shape.

6. The device substantially as set forth in claim 2 wherein said aperture is elliptical in shape.

7. The device substantially as set forth in claim 2 wherein said aperture is square in shape.

8. The device substantially as set forth in claim 2 wherein said aperture is gear shaped.

References Cited by the Examiner

UNITED STATES PATENTS

| | | | |
|---|---|---|---|
| 2,957,386 | 10/1960 | Robinson | 250—237 X |
| 3,076,949 | 2/1963 | Anderson | 250—203 X |
| 3,141,095 | 7/1964 | Klose | 250—237 X |
| 3,144,511 | 8/1964 | Bouwers | 88—1 |
| 3,165,632 | 1/1965 | Hansen | 250—203 |
| 3,244,896 | 4/1966 | Walker | 250—236 |

RALPH G. NILSON, *Primary Examiner.*

WALTER STOLWEIN, *Examiner.*